O. D. BARRETT.
Revolving-Harrow.
No. 25,620.
Patented Oct. 4. 1859.
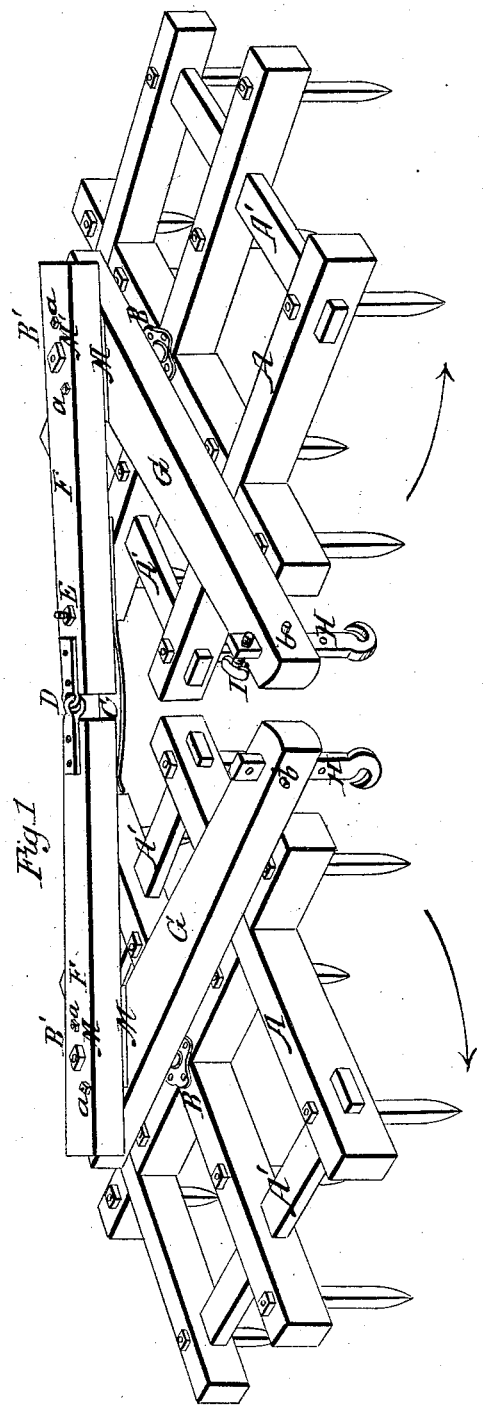

UNITED STATES PATENT OFFICE.

O. D. BARRETT, OF CLEVELAND, OHIO.

IMPROVEMENT IN ROTARY HARROWS.

Specification forming part of Letters Patent No. 25,620, dated October 4, 1859.

*To all whom it may concern:*

Be it known that I, O. D. BARRETT, of Cleveland, in the county of Cuyahoga and State of Ohio, have invented a new and useful Improvement in Harrows; and I do hereby declare that the following is a full and exact description thereof, reference being had to the accompanying drawing, and the letters of reference thereon, making a part of this specification.

The drawing is a perspective view of my improvement, and shows the toothed frames A A, made of three pieces of timber placed parallel to each other at equal distances apart, and halved into another piece at right angles to them at their centers, and so cut off as to the ends that teeth placed in them will be equidistant from each other. The frames may be strengthened by inserting through the three parallel timbers slats A' A', one on each side of the center timber, halved into the other three. In case more teeth are desired, in the place of the slats A' A' timbers like the rest may be halved into the first three and cut off as to their ends, as above.

The center pins, B B' B B', are made fast to the toothed frames A A.

The thimbles $m\ m'\ m\ m'$ are made like pipe-boxes, and have flanges at $m\ m$ in their centers, which come between the draft-bars G G and the jointed arms F F.

The draft-bars G G and the jointed arms F F are fastened firmly together on the thimbles $m\ m'\ m\ m'$ by the bolts $a\ a\ a\ a$ passing through the draft-bars, flanges on the thimbles, and the jointed arms.

A hook-and-eye joint, D, connects the two arms F F. A spring, C, is placed under the two arms at their junction and made adjustable by the screw E.

The draft-hooks H H, inserted in the ends of the draft-bars G G, may be raised or lowered at pleasure by means of the pins $b\ b$.

Having described the harrow in detail, I will now describe its operation.

The team being attached to the two hooks H H by proper appliances, the draft will cause the two harrows to tend toward each other. This causes the jointed arms F F to rise at D, which rising is controlled by the spring C. Thus the two harrows must run lighter in the soil on their adjacent sides than on their opposite sides, and being free to turn on their center pins they rotate in opposite directions, as marked by the arrows. By means of the joint D all the desirable qualities of the common jointed harrow are secured to the rotating harrow. By it the harrow adapts itself to the unevenness of the ground, and either one of the harrows can be thrown over the other. By fastening the harrows in this position by means of the draft-hooks and thumb-screw I, and tipping them up on their sides, with the joint D on the upper side, the harrow becomes a kind of cart, and can be drawn as such from field to field at pleasure. Loosening the spring C and lowering the hooks H H increases the tendency of the harrows to rotate. These must be varied according to the soil.

What I claim as my invention, and desire to secure by Letters Patent, is—

The arrangement of the hooks H H, draft-bars G G, center pins, B B' B B', arms F F, and spring-joint D in relation to each other and to the harrows, as and for the purpose herein set forth.

O. D. BARRETT.

In presence of—
C. ROBINSON,
MERRILL BARLOW.